(12) United States Patent
Elwell et al.

(10) Patent No.: US 7,059,031 B1
(45) Date of Patent: Jun. 13, 2006

(54) METHOD FOR REPLACING A VEHICLE GRILLE

(75) Inventors: James P. Elwell, Johnston, IA (US); Chad L. Mesenbrink, Ames, IA (US)

(73) Assignee: Putco, Inc., Story City, IA (US)

( * ) Notice: Subject to any disclaimer, the term of this patent is extended or adjusted under 35 U.S.C. 154(b) by 30 days.

(21) Appl. No.: 10/896,210

(22) Filed: Jul. 21, 2004

(51) Int. Cl.
*B60K 11/04* (2006.01)

(52) U.S. Cl. .................... 29/401.1; 29/402.08; 29/464; 293/115; 180/68.6

(58) Field of Classification Search ............. 29/402.08, 29/401.1; 293/115; 180/68.6
See application file for complete search history.

(56) References Cited

U.S. PATENT DOCUMENTS 6,854,545 B1 * 2/2005 Elwell et al. .............. 180/68.6

OTHER PUBLICATIONS 2001-02 Chevy Silverado 2500 3500 (excluding 2500HD) All Chrome Grille (Grill). Catalog [online]. 1A Auto, 1999-2005 [retrieved on Jun. 21, 2004] Retrieved from the Internet <URL: http://www.1aauto.com/1A/Grilles/ . . . .*
. . . ChevyTruck/Silverado/EV1053999/40220>.*
Street Scene Speed Grilles, Front Valances & Bumper Covers. Catalog [online]. Street Scene Equipment, 2003 [retreived on Apr. 11, 2003] Retreived from the Internet <URL: http://www.SSE_Speed_Grilles_Spoilers.html>.*

* cited by examiner

*Primary Examiner*—Marc Jimenez
*Assistant Examiner*—Christopher Agrawal
(74) *Attorney, Agent, or Firm*—McKee, Voorhees & Sease, P.L.C.

(57) ABSTRACT

An apparatus and method is provided for replacing a grille on a vehicle. The method comprises removing the first grille that has a pattern of openings and attaching a second grille that is different from the first grille in the same location in which the first grille was located.

5 Claims, 6 Drawing Sheets

METHOD FOR REPLACING A VEHICLE GRILLE

BACKGROUND OF THE INVENTION

The invention relates to an improved apparatus and method for replacing a grille on a vehicle.

As consumers' tastes change and as consumer demand grows for a more personalized vehicle, the number and types of vehicle grilles keeps increasing. Therefore, vehicle grilles have various designs and decorative features. For example, if consumers dislike the manufacturer's grille on a vehicle, there are various after-market grille components, such as grille inserts, that consumers can purchase. However, grille inserts merely attach to the existing grille, and the existing grille is not removed. If consumers find a particular grille especially undesirable, there is a need to completely remove and replace the undesirable grille with a different grille that is more desirable to consumers.

In particular, some consumers dislike the cross member that extends across the front of the grille on new models of Chevrolet™ trucks. By replacing the Chevrolet™ grille with an improved grille that is desirable to consumers, car dealers are able to sell more Chevrolet™ trucks. However, this apparatus and method is not limited to Chevrolet™ trucks, but can also include other brand names and other types of vehicles.

For the foregoing reasons, there is a need for an improved vehicle grille which replaces the undesirable grille on a vehicle.

Another object is to remove the existing grille and adjacent hardware and replace with a new grille and adjacent hardware.

Another object is a new grille that does not deface the vehicle, but upon completion looks like the original grille and hardware but with a different ornamental appearance.

Another object is a new grille that utilizes the same attachment members as the original grille and hardware.

Another object is a new grille that eliminates any cross members that extend across the original grille.

Another object is the ability to replace the original logo with a different logo.

Another object is to provide a place for attaching a logo to the front face of the grille.

Another object is a new grille appearance that is attractive in appearance, efficient in replacement, and economical to manufacture.

These, as well as other features and advantages of the present invention, will become apparent from the following specification and claims.

SUMMARY OF THE INVENTION

The present invention is directed to an apparatus and method that satisfies the need for an improved vehicle grille which can replace the existing grille on a vehicle. A grille and method which satisfies these needs comprises replacing a first grille attached to a vehicle with a second grille. The first grille has a first pattern of openings therein and the second grille has a second pattern of openings therein that is different from the first pattern. The method further comprises removing the first grille from the vehicle and attaching the second grille to the vehicle in the same location where the first grille had been located.

In another aspect, the pattern of openings on the first grille is divided into two or more partitions by a cross member that extends across the forward end of the vehicle.

In another aspect, the first grille has a perimeter and a cross member with an extension end that extends outside the perimeter, the method further comprising attaching the second grille to the vehicle. The second grille has an extension member that is shaped like the extension end of the cross member on the first grille and that is positioned on the vehicle in the same location that the extension end of the first grille cross member had previously been attached.

In another aspect, the second grille includes a forwardly presented face after being attached to the vehicle, the method further comprising attaching a logo member to the forwardly presented face of the second grille.

In certain implementations, the method for attaching the grille to the vehicle comprises fastening the grille to the vehicle, wherein the grille comprises a body member, the body member having an undivided pattern of openings, the undivided pattern of openings being surrounded by a perimeter member, the perimeter member communicating with first and second extension members that extend outside the perimeter member, the first and second extension members being located on opposite sides of the perimeter member.

In another aspect, the pattern of openings in the body member includes openings that are circular in shape.

In another aspect, the first and second extension members that are located on opposite sides of the perimeter member extend away from each other in a linear plane.

In another aspect, the vehicle is a truck, and, more specifically, can be a Chevrolet™ truck.

In another aspect, attaching the grille to the vehicle comprises attaching the body member to the vehicle, attaching the perimeter member to the body member, attaching the first extension member to the perimeter member and the vehicle, and attaching the second extension member to the perimeter member and the vehicle. Attaching the perimeter member to the body member may take place before attaching the body member to the vehicle. Attaching the first and second extension members to the perimeter member may take place before attaching the body member to the vehicle.

In certain implementations, the method for replacing the first grille attached to the forward end of the vehicle with a second grille comprises removing the first grille from the vehicle, wherein the first grille has a cross member that is mounted across the forward end of the vehicle. The cross member divides the pattern of openings in the first grille into two or more partitions. Then the second grille is attached to the forward end of the vehicle. The second grille comprises a pattern of openings that is undivided.

In another aspect, the cross member extends continuously from a first side of the forward end of the vehicle to a second side of the forward end of the vehicle, the first and second sides being opposite of each other.

In certain implementations, the apparatus is a combination of a vehicle having a forward end and a grille opening and an extension opening in the forward end. The grille opening has a grille opening perimeter. The extension opening is located in communication with the grille opening and extends outside the grille opening perimeter. The combination includes a second grille filling the grille opening that is different from the first grille that had previously filled the grille opening. The combination also includes an extension member that fills the extension opening.

In another aspect, the combination includes an extension opening that includes first and second extension openings both of which are in communication with the grille opening and both of which are outside the grille opening perimeter.

A first extension member fills the first extension opening and a second extension member fills the second extension opening.

These and other features, aspects, and advantages of the invention will be apparent from the following description, appended claims, and accompanying drawings.

DESCRIPTION OF THE PREFERRED EMBODIMENT

The present invention will be described as it applies to its preferred embodiment. It is not intended that the present invention be limited to the described embodiment. It is intended that the invention cover all modifications and alternatives which may be included within the spirit and scope of the invention.

Figure 1A:
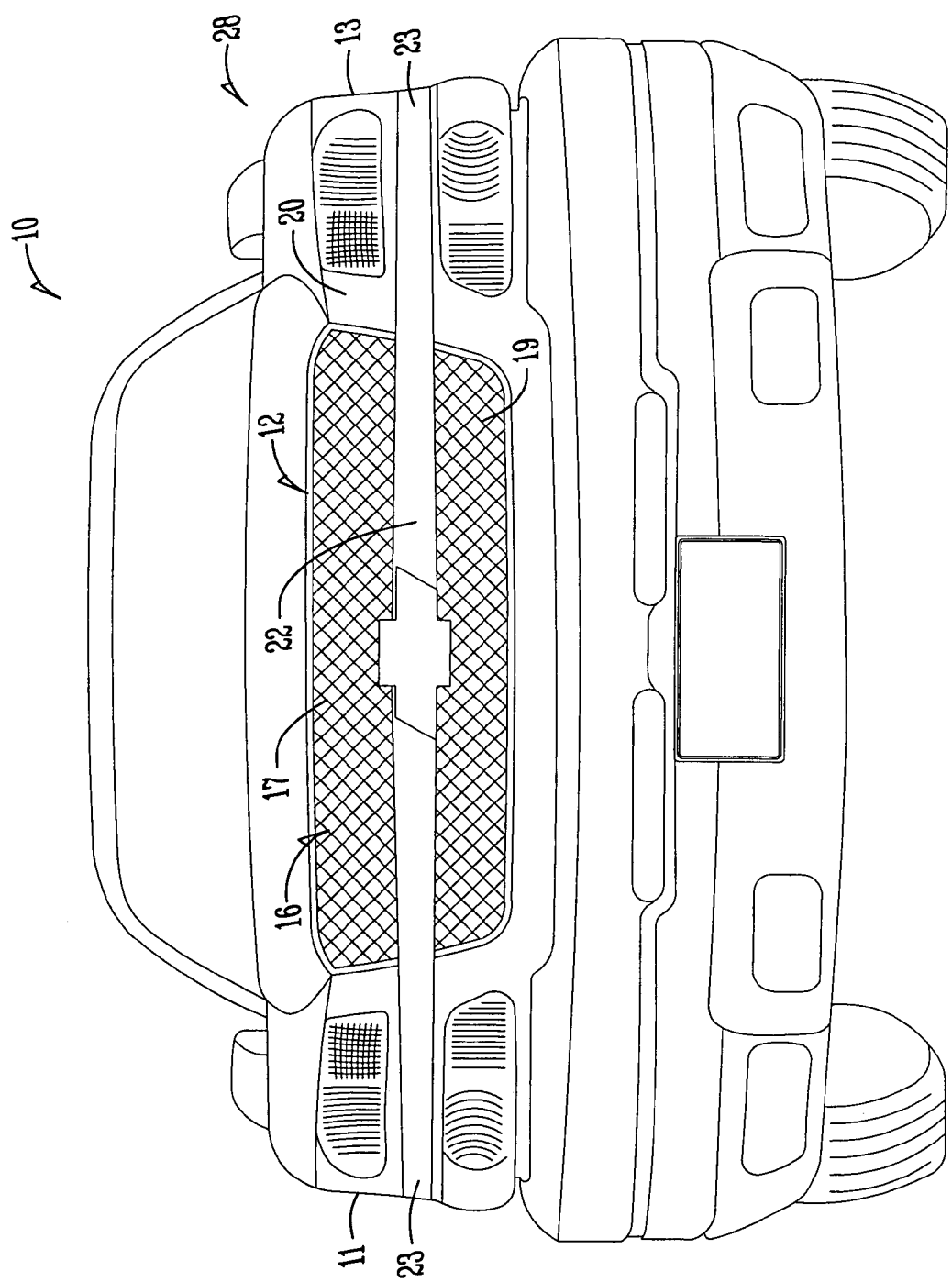
FIG. 1A shows a front view of a prior art first grille attached to a vehicle.
Figure 1B:
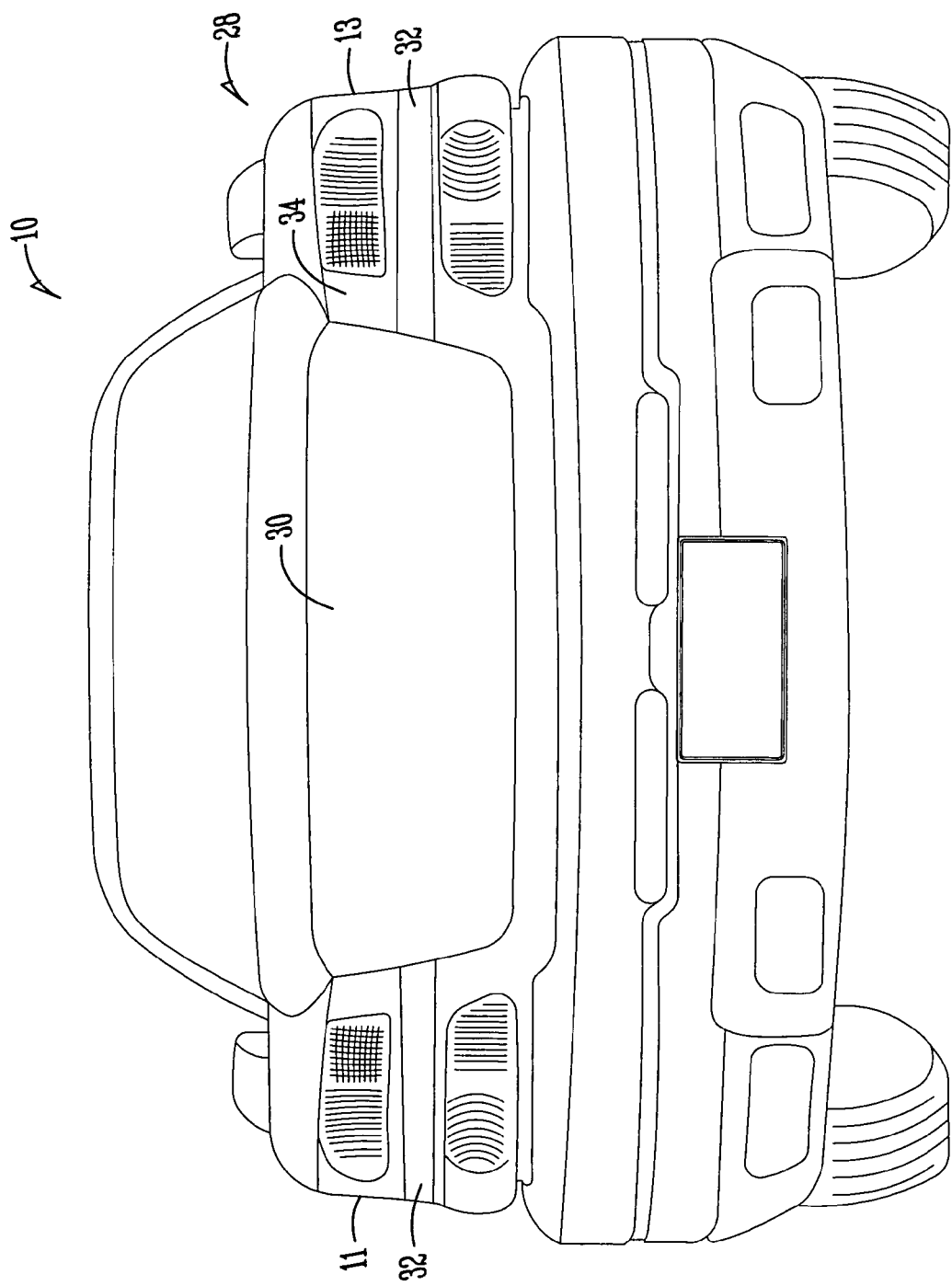
FIG. 1B shows a front view of the vehicle without a grille attached to it.

Referring to FIG. 1B, a vehicle 10 has an opening in forward end 28 where a grille can be attached. The opening in the forward end 28 comprises a grille opening 30. A grille opening perimeter 34 surrounds the grille opening 30 on the bottom and vertical sides. Extension openings 32 are located in communication with the grille opening 30 and extend outside the grille opening perimeter 34. Even though the extension openings 32 extend away from each other in roughly a linear plane in FIG. 1B, it is possible to have the extension openings 32 extending from the grille opening 30 in an infinite number of directions and orientations.

Referring to FIG. 1A, a first grille 12 is attached to the forward end 28 of the vehicle 10. The first grille 12 includes a first pattern of openings 16, a first grille perimeter 20 surrounds the first pattern of openings 16 on the bottom and vertical sides, and a first grille cross member 22 extends horizontally across the forward end 28 of the vehicle 10. The cross member 22 includes extension ends 23 that extend outside the first grille perimeter 20 and that are in communication with the first pattern of openings 16. The cross member 22 divides the first pattern of openings 16 into an upper partition 17 and a lower partition 19. In FIG. 1A, the cross member 22 is oriented parallel to the ground assuming the vehicle 10 is resting on a flat surface. The cross member 22 extends continuously from a first side 11 to a second side 13 of the forward end 28 of the vehicle 10. The first side 11 is located opposite from the second side 13. The cross member 22 divides the first pattern of openings 16 into upper and lower partitions, 17 and 19, respectively.

It is recognized that the cross member 22 can be oriented in other angles or positions with respect to the forward end 28 of the vehicle 10 and the flat surface. It is also recognized that there could be multiple cross members oriented in various patterns thereby dividing the first pattern of openings into more than two partitions. It is also possible that the cross member need not extend outside the first pattern of openings 16 in order to divide the first pattern of openings 16 into partitions. While the first pattern of openings 16 in the drawings includes a criss-cross pattern of diagonal lines oriented perpendicular to each other, it is possible to use other types of patterns.

Figure 2:
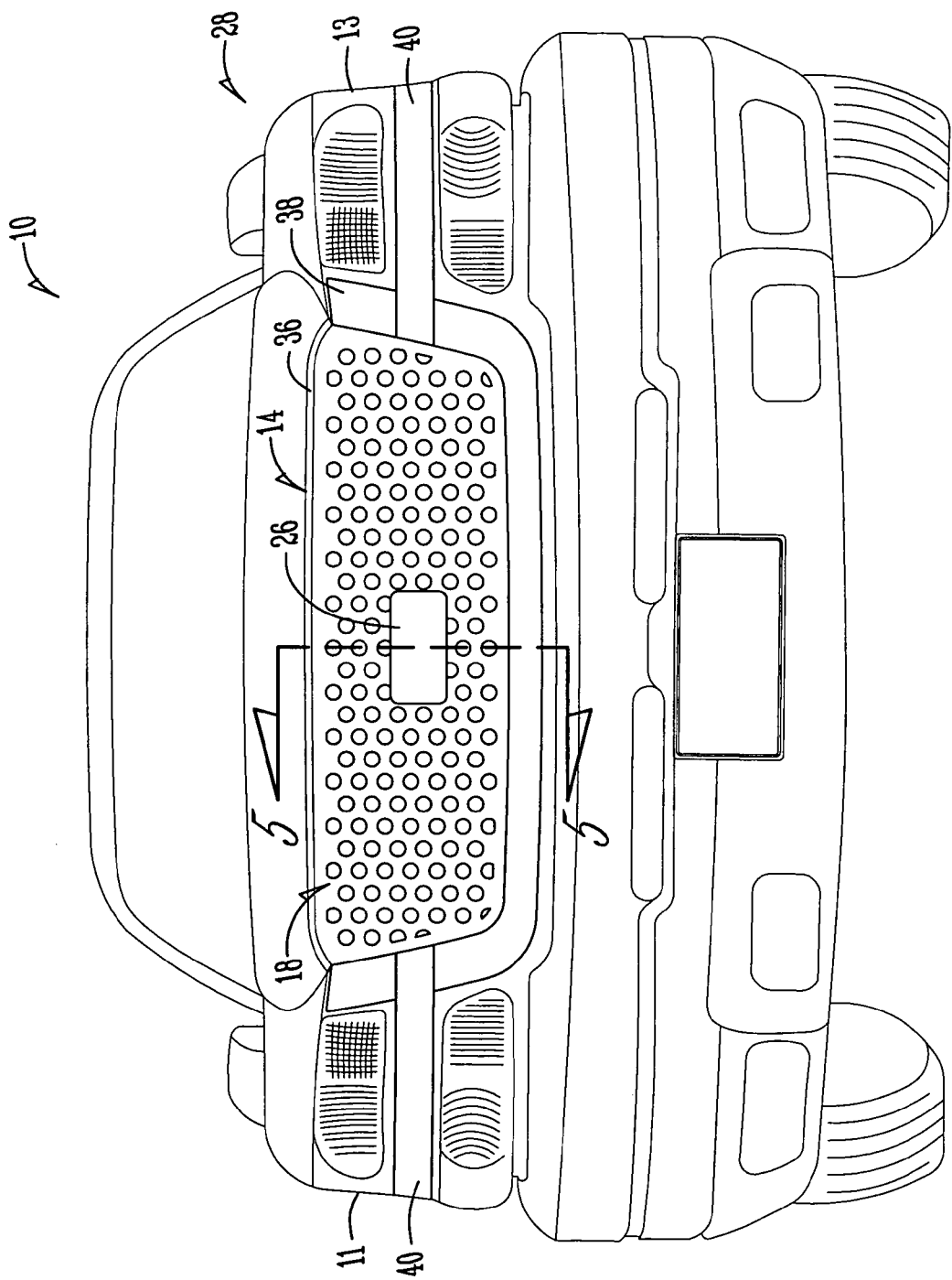
FIG. 2 shows a front view of a second grille attached to the vehicle in place of the first grille.

Referring to FIG. 2, a second grille 14 is attached to the forward end 28 of the vehicle 10. The second grille 14 includes a body member 36 having a second pattern of openings 18, a perimeter member 38 surrounding the body member 36 on the bottom and vertical sides, and extension members 40 that extend outside the perimeter member 38. The extension members 40 fill the same extension opening 32 (FIG. 1B) as the extension ends 23 of the first grille cross member 22 (FIG. 1A). A logo member 26 is attached to a forwardly presented face 24 (FIG. 3) of the body member 36.

Figure 3:
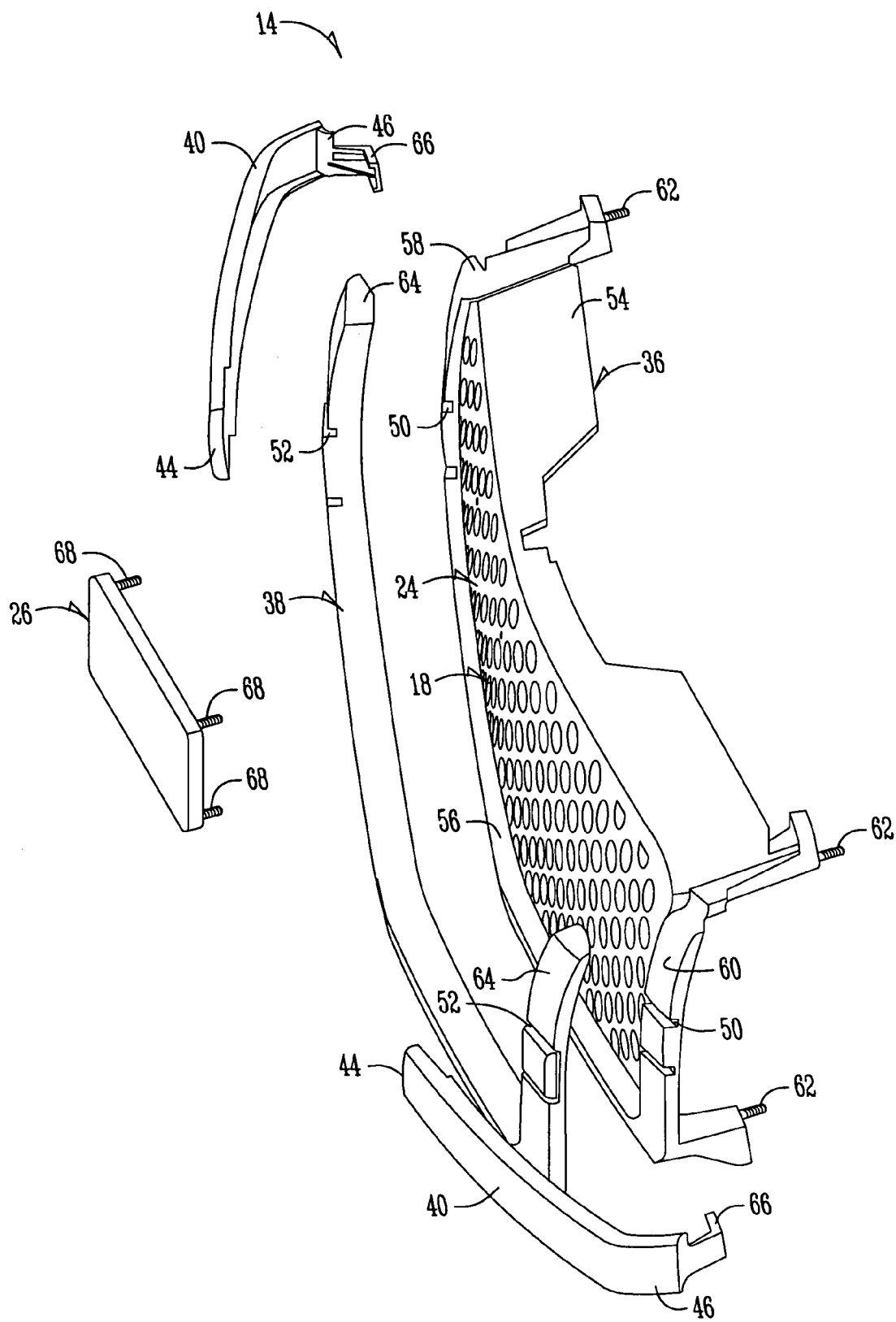
FIG. 3 shows an exploded front perspective view of the second grille.

Referring to the second grille 14 in FIG. 3, the second pattern of openings 18 of the body member 36 is surrounded by a top side 54, a first vertical side 58, a second vertical side 60, and a lower side 56. The first and second vertical sides, 58 and 60, include grooves 50 for attaching the perimeter member 38 to the body member 36, such as by snapping the perimeter member 38 to the body member 36. It is possible to use other fastening methods. The body member 36 includes fasteners such as bolts 62 used for attaching the body member 36 to the grille opening 30 in the forward end 28 of the vehicle 10.

Still referring to FIG. 3, the perimeter member 38 includes upwardly extending arms 64 that have grooves 52. The extension members 40 include a first end 44 and a second end 46, the first and second ends being located opposite from each other. The first end 44 of extension member 40 attaches into the grooves 52 of the upwardly extending arms 64. It is possible to use various fastening methods to attach the first end 44 to the perimeter member 38. The second end 46 includes a fastener 66 for attaching the extension member 40 to the vehicle 10 such as by clipping or snapping the second end 46 of the extension member 40 to the vehicle 10.

Figure 5:
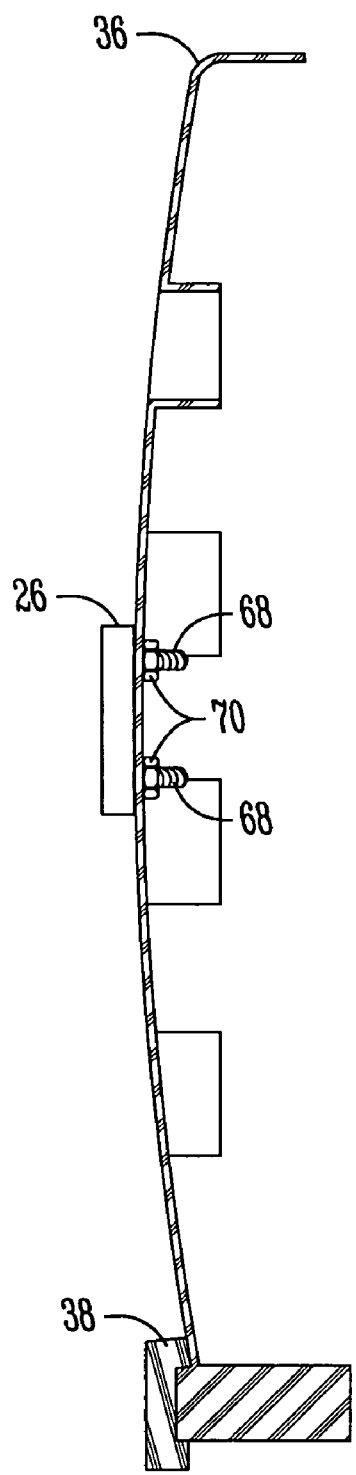
FIG. 5 shows a sectional view of the second grille taken along line 5 of FIG. 2.

When the second grille 14 is attached to the vehicle, it has a forwardly presented face 24. The logo member 26 can be attached to the forwardly presented face 24 of the second grille 14 before or after attaching the grille to the vehicle 10. Referring to FIG. 5, the logo member 26 is attached to the forwardly presented face 24 using fasteners such as bolts 68 and nuts 70. Even though the logo member 26 is rectangular in shape in the drawings, the logo member 26 may be any shape or size that consumers desire to attach to the second grille 14.

Figure 4:
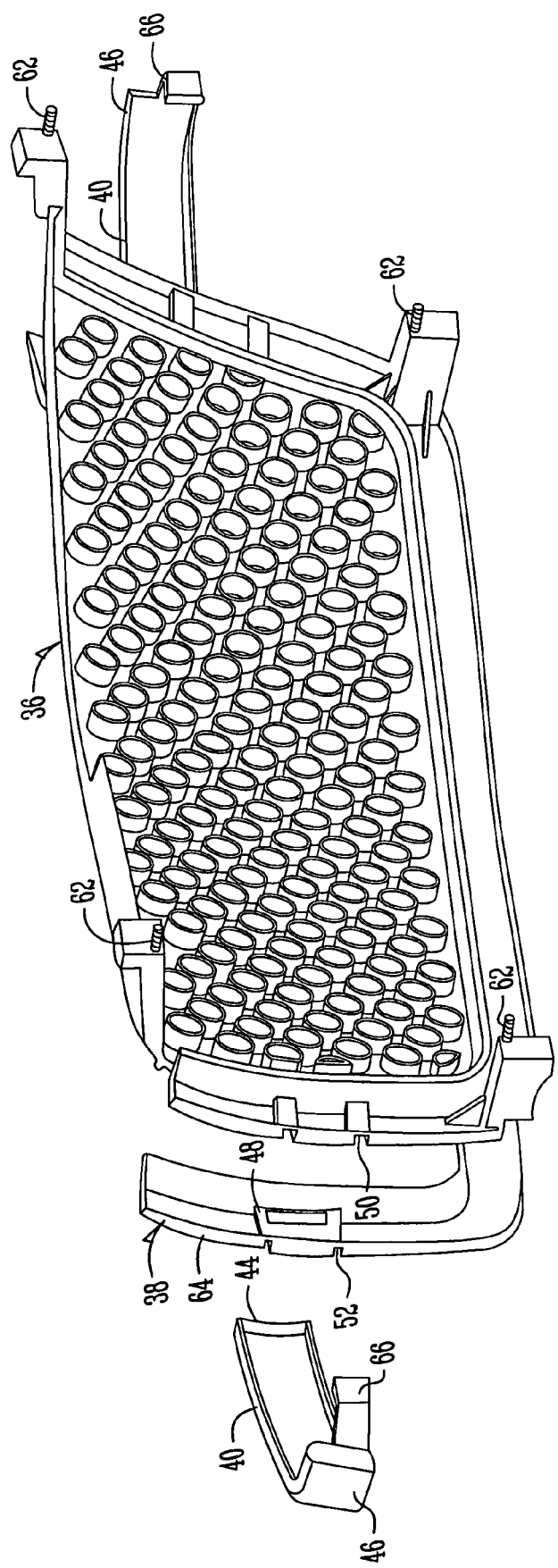
FIG. 4 shows an exploded rear perspective view of the second grille.

FIG. 4 shows more clearly the fasteners such as bolts 62 used to attach the body member 36 to the vehicle 10. The upwardly extending arms 64 include protrusions 48 which fit into the grooves 50 of the body member 36 in order to attach the perimeter member 38 to the body member 36.

The vehicle 10 has been generically referred to. However, the term vehicle can include but is not limited to trucks, and more specifically, Chevrolet™ trucks.

In the drawings, the perimeter member 38 surrounds the body member 36 on three sides. It is possible that a different perimeter member could be used which surrounds the body member on only one, two, or all four sides. It is also possible that no perimeter may be used or that the perimeter member is molded as a single piece with the body member. The drawings show the second grille 14 as an assembly of various components. It is possible to assemble all the components before the second grille 14 is attached to the vehicle 10, and therefore, the second grille 14 can attach as one piece to the vehicle 10. Therefore, the second grille 14 can be attached as if it were a one-piece molded grill.

In the drawings, the second pattern of openings 18 on the second grille 14 comprises a plurality of openings spaced evenly apart. The openings are circular in shape but the openings may also be other shapes. An undivided pattern of openings means no structure such as cross member 22 separates the openings into partitions, sections, or segments.

The method of replacing the first grille 12 with the second grille 14 first comprises fully removing first grille 12 from the vehicle 10. This step includes removing the first pattern of openings 16, the first grille perimeter 20, first grille cross member 22, extension ends 23, existing logo members that may be attached or a part of first grille 12, and other hardware used to attach the first grille 12 to the vehicle 10.

Then the second grille 14 can be attached to the vehicle 10 in the same position in which the first grille 12 was attached. This step includes placing the body member 36, the perimeter member 38, and the extension members 40 into the grille opening 30, the grille opening perimeter 34, and the extension openings 32, respectively, and attaching these members to the vehicle 10. One method of attaching the second grille 14 to the vehicle 10 includes using the same hardware and method of attachment as is used on the first grille 12. It is recognized that the second grille 14 can be attached using other methods and in different attachment locations as the first grille 12. The hardware used for attachment and the locations of attachment to the vehicle are not critical to the invention.

A logo member such as logo member 26 can be attached to the forwardly presented face 24 of the second grille 14 using fasteners such as bolts and nuts. However, the attachment of a logo member is optional.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A method for replacing a first grille attached to a vehicle with a second grille, the method comprising:

removing the first grille from the vehicle, the first grille comprising a cross member that is mounted across the forward end of the vehicle, the cross member dividing a pattern of openings in the first grille into two or more partitions;

attaching the second grille to the vehicle in the same location where the first grille had been located, the second grille comprising a pattern of openings that is undivided.

2. The method of claim 1 wherein the first grille is attached to a forward end of the vehicle.

3. The method of claim 1 wherein the step of attaching the second grille to the vehicle further comprises attaching first and second extension members shaped like the first and second extension members of the first grille cross member to the vehicle in the same location that the first and second extension members of the first grille cross member had previously been attached.

4. The method of claim 3 and further comprising presenting a face of the second grille in a forward direction after having been attached to the vehicle.

5. The method of claim 4 and further comprising attaching a logo member to the forwardly presented face of the second grille.

* * * * *